(12) United States Patent
Sus et al.

(10) Patent No.: US 7,775,156 B2
(45) Date of Patent: Aug. 17, 2010

(54) FRY BASKET FOR PROCESSING OF BULK FOOD ITEMS AND METHOD

(75) Inventors: Gerald A. Sus, Frankfort, IL (US); Glenn Schackmuth, Oswego, IL (US); Henry T. Ewald, Roselle, IL (US); Juan Carlos Caviedes, Naperville, IL (US); Matthew R. Segal, Cary, NC (US)

(73) Assignee: Restaurant Technology, Inc., Oak Brook, IL (US)

( * ) Notice: Subject to any disclaimer, the term of this patent is extended or adjusted under 35 U.S.C. 154(b) by 1008 days.

(21) Appl. No.: 11/413,870

(22) Filed: Apr. 28, 2006

(65) Prior Publication Data

US 2007/0251517 A1 Nov. 1, 2007

(51) Int. Cl.
*A47J 37/12* (2006.01)

(52) U.S. Cl. ............... 99/410; 99/413; 99/426; 99/450

(58) Field of Classification Search ........... 99/407, 99/410, 411, 412, 413, 414, 415, 450, 426; 294/26.5; 211/181.1
See application file for complete search history.

(56) References Cited

U.S. PATENT DOCUMENTS

| | | | | |
|---|---|---|---|---|
| 92,867 | A | * | 7/1869 | Mitchell .................... 99/448 |
| 651,977 | A | * | 6/1900 | Rose ........................ 294/26.5 |
| 1,390,772 | A | * | 9/1921 | Fontaine et al. ............ 294/26.5 |
| 2,557,613 | A | * | 6/1951 | Palensky .................... 99/413 |
| 2,628,738 | A | * | 2/1953 | Hilldale .................... 220/522 |
| 3,007,733 | A | * | 11/1961 | Ota ........................ 294/26.5 |
| 3,975,997 | A | | 8/1976 | DiPietro |
| 4,006,675 | A | | 2/1977 | Lill |
| 4,508,027 | A | | 4/1985 | McCord |
| 4,535,688 | A | | 8/1985 | Bentson |
| 4,542,684 | A | | 9/1985 | Cantrell |
| 4,542,685 | A | * | 9/1985 | Wilson ..................... 99/413 |
| 4,722,267 | A | | 2/1988 | Galockin et al. |
| 4,803,917 | A | * | 2/1989 | Barbieri .................... 99/356 |
| 4,852,471 | A | | 8/1989 | Lansing |
| 4,854,227 | A | * | 8/1989 | Koopman ................... 99/416 |
| 4,979,864 | A | | 12/1990 | Cahlander et al. |
| 5,115,731 | A | | 5/1992 | Maitland |
| 5,189,944 | A | | 3/1993 | Rasmussen et al. |
| 5,239,915 | A | * | 8/1993 | Chiu ....................... 99/407 |
| 5,282,319 | A | | 2/1994 | Casquilho et al. |
| 5,305,686 | A | | 4/1994 | Svensson |
| 5,443,173 | A | | 8/1995 | Emery et al. |
| 5,802,960 | A | * | 9/1998 | Graj et al. .................. 99/403 |
| 5,992,306 | A | | 11/1999 | Chiang |
| 6,062,132 | A | | 5/2000 | Morris |
| 6,176,175 | B1 | | 1/2001 | Moreth |
| 6,415,934 | B1 | | 7/2002 | Veltrop et al. |
| 6,427,583 | B1 | | 8/2002 | Shimansky et al. |
| 6,591,741 | B1 | | 7/2003 | Martin |
| 6,732,636 | B1 | | 5/2004 | Germano |
| 2002/0017198 | A1 | | 2/2002 | Gauthier et al. |

(Continued)

*Primary Examiner*—Reginald L Alexander
(74) *Attorney, Agent, or Firm*—Ryndak & Suri LLP (57) ABSTRACT

An open top fry basket device suited for use in a semi-automated food processing station, system and method is provided that allows cooked food items to be dispensed through a pivotable bottom of the fry basket actuated by the operator. The efficient and ergonomic design permits emptying of the fry basket without necessitating the turning over of the basket to dump the contents into a food storage bin.

21 Claims, 5 Drawing Sheets

U.S. PATENT DOCUMENTS

| | | |
|---|---|---|
| 2003/0205028 A1 | 11/2003 | Sus et al. |
| 2003/0207009 A1 | 11/2003 | Sus et al. |
| 2004/0020555 A1 | 2/2004 | Sus et al. |
| 2005/0193898 A1 | 9/2005 | Sus et al. |
| 2005/0204929 A1 | 9/2005 | Rosenzweig |
| 2005/0268791 A1 | 12/2005 | Svabek et al. |
| 2005/0269332 A1 | 12/2005 | Svabeck et al. |

* cited by examiner

FRY BASKET FOR PROCESSING OF BULK FOOD ITEMS AND METHOD

BACKGROUND OF THE INVENTION

1. Field of the Invention

The invention relates generally to food processing of bulk fast food items and, more particularly, to food processing, storing and dispensing of bulk fast food items, such as French fries, at a quick-service type restaurant.

2. Background Art

In restaurants, especially quick-service restaurants, fast, consistent, efficient and safe food preparation is essential for a successful operation. The quality of the prepared food depends in large part on the consistency of food preparation and processing and storage of the food items after cooking operations have been completed.

Consistency in food preparation and storage times for cooked food items may vary as a result of many factors. For example, people engaged in food preparation often must perform multiple tasks at frequencies that vary with time because of constantly varying customer demand throughout the day. For example, lunchtime and dinnertime may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food.

The food must be cooked using correct procedures and must be processed after cooking under appropriate conditions for the proper time. Additionally, because of time constraints on the employees, especially at rush times such as lunch or dinner periods, the employees are needed to work efficiently during bursts of activity and any time or effort savings device that assists the operator in completing his or her tasks is important in enabling the reduction in work effort while maintaining employee satisfaction in their work environment.

Food preparation can be labor intensive, and thus, the labor cost can be a large portion of the total cost of the prepared food. Although quick-service restaurants have existed for many years and now number in the tens of thousands, such establishments generally utilize manual labor to prepare and process food. While there have been various improvements in commercial equipment used for cooking and storage of food in quick-service restaurants, such restaurants are believed to be substantially all manually operated and relatively labor intensive. Providing more efficient, better and safer working conditions to the employees of such restaurants is necessary to the well being of the employees and to the efficient operation of such restaurants.

Frying bulk items in a deep fryer has traditionally been done using mesh wire baskets which include a plurality of openings that permit hot oil, but not the bulk food items which have been placed into the baskets, to pass through the wire basket walls. In most conventional manually operated deep fryer stations, after the frying operation is complete, the operator lifts the wire mesh basket containing the bulk food items out of the oil or shortening in the frying vat, and rests it on a hook on a rear wall of the fryer. The hook is usually disposed on an opposite side of the basket from the side connecting to the handle of the fry basket. The fry basket is attached to the hook for a sufficient period of drip time to permit excess oil to drip from the bulk food items, for example, French fries, back into the frying vat, which is disposed below the basket attachment. After the appropriate time has elapsed, and excess oil has dripped from the bulk food items, but not so long as to appreciably cool the bulk food items, the operator then once again will pick up the basket by the handle, and turn the basket over to dump the bulk food items into a bulk food processing station, usually adjacent the fry vat, where the bulk food items are then optionally seasoned and packaged for dispensing to the customer.

However, it has been found that the procedure of turning over the basket to dump the bulk food items therefrom may be unsanitary, ergonomically taxing on the operator, and may result in less than ideal working conditions. For example, turning the basket over, even when performed over a surface, may produce oil splattering due to centripetal forces that act on remaining drops of oil that may be left on the wire mesh, but are not large enough to fall off by gravitational action during the drip time. Oil flung from the rotating basket often ends up on the floor adjacent the fry station, thereby possibly creating a slip hazard and or unsanitary conditions.

Additionally, the turning over of the wire mesh basket manually by the operator requires having a firm grip on the handle and then an unnatural action of the arm which must simultaneously twist and lift the basket into position so as to enable the dumping of the bulk food items into the bulk food hopper or processing tray. To permit such an unnatural action, handles to date are required to extend horizontally from the fry basket wall, so that turning the basket over does not change the height of the location where the fry basket ends up. Thus, the horizontally extending fry basket handle is susceptible to seeping or flowing fluids, such as oil from the fryers, when the handle is turned over at an angle so that it is below the relative level of the fry basket.

Accordingly, a need exists for a commercially suitable bulk food dispensing, storage and packaging device, system and method for fried foods, that includes a fry basket that can be operated efficiently and with a minimum of human effort in the manipulation of the wire basket while helping to retain manual control over the basket. A need for an ergonomically user friendly apparatus and device that avoids the problem of oil splattering when the wire baskets are overturned is also apparent.

SUMMARY OF THE INVENTION

In accordance with the present invention, a fry basket is disclosed and claimed herein that includes an open top wire mesh device for use in deep frying of bulk food items, comprising a wire mesh basket portion having a bottom wall, a first pair of opposed wire mesh side walls and a second pair of opposed wire mesh side walls, at least one wall of the first wire mesh side walls being attached to the bottom wall in a pivotable connection, and a handle portion extending from the top of one of the second side walls, the handle portion comprising a handle extending away from the wire mesh basket portion.

In another aspect of the present invention, the fry basket includes a handle that extends from the essentially vertical end wall of the fry basket, to which it is attached at an obtuse angle up to about 135°. The capability of the present inventive fry basket to empty its contents without requiring the basket to be turned over to dump the bulk food items from the fry basket, provides the added benefit that the shape of the handle can be designed without the constraint of having to be turned over. Thus, as is disclosed and claimed herein, other ergonomic features of the invention are enabled, for example, lateral shift stays that inhibit sideways motion of the fry basket, as will be described below.

In accordance with yet another aspect of the present invention, an ergonomically efficient basket release is operational by a single manual operation. In a preferred form, the release is an actuator that can pivot the bottom of the basket.

DETAILED DESCRIPTION OF THE INVENTION

In accordance with the present invention, a fry basket apparatus is disclosed. The fry basket in accordance with the invention allows bulk food items to be fried, processed and dispensed to a food holding area for subsequent processing by a human operator and packaging in a suitable container.

Referring now to the drawings in which like reference characters designate like or corresponding parts throughout the several views, there is shown in FIGS. 1-4 and 6 a fry basket apparatus 10, comprising fry basket 12 and a handle 90 embodying one form of the present invention. Fry basket 12 is constructed of intermeshed wire welded at attachment points and includes two opposed side walls 16, two opposed end walls, a first end wall 18 and a second end wall 19, a bottom 20 and an open top 22. All side walls 16, end walls 18 and 19, and bottom 20 are constructed in a wire pattern to form a plurality of openings that are sufficiently large to allow rapid egress and ingress of cooking oil and yet are sufficiently small to prevent bulk food items from passing through the basket walls.

Handle 90 is attached to first end wall 18 of fry basket 12 and is used to lower the basket into a vessel, such as a fry vat (not shown), containing oil and after the bulk food items have been cooked, to remove it from the fry vat. After basket 12 is lifted out of the fry vat, it may be temporarily held or located above or mounted on a rack above the fry vat to let the excess oil drip back into the fry vat, after which the bulk food items are dispensed into a bulk food item storage space or hopper, as is described in commonly assigned U.S. application Ser. No. 11/413,233, filed on Apr. 28, 2006, the disclosure of which is incorporated herein by reference.

As shown, the wire mesh that forms the basket 12 is made more rigid so as to withstand impacts and/or accidental twists by several rods that follow the edges of side walls 16, and first and second end walls 18, 19 and basket bottom 20, which further define the corners where side walls 16, end walls 18,19 and bottom 20 meet.

For example, the top edges include a reinforcing bead comprised of two strengthening rods 32 that are disposed around the periphery of opening 22, and attached to the top of wire mesh side walls 16 and end walls 18,19. The wire mesh walls are attached to an inner diameter of rods 32, by welding, spot welding, or other appropriate means, but it is contemplated that other connection structures, for example, connecting to the outer diameter of strengthening rods 32, may be utilized.

The wire rods also extend around other parts of the wire basket, and together these rods provide a frame to hold wire mesh walls 16,18,19 and 20 in place. For example, a corresponding lower rod frame 34, also comprising two rods bent into a generally rectangular shape, surrounds the bottom edges of side and end walls 16,18 and 19 of the fry basket 12. Although not shown, the rod framework may be complemented by optional rods that could extend from the corners of the top rectangular rod frame to the corresponding corners of lower rod frame 34.

Figure 6:
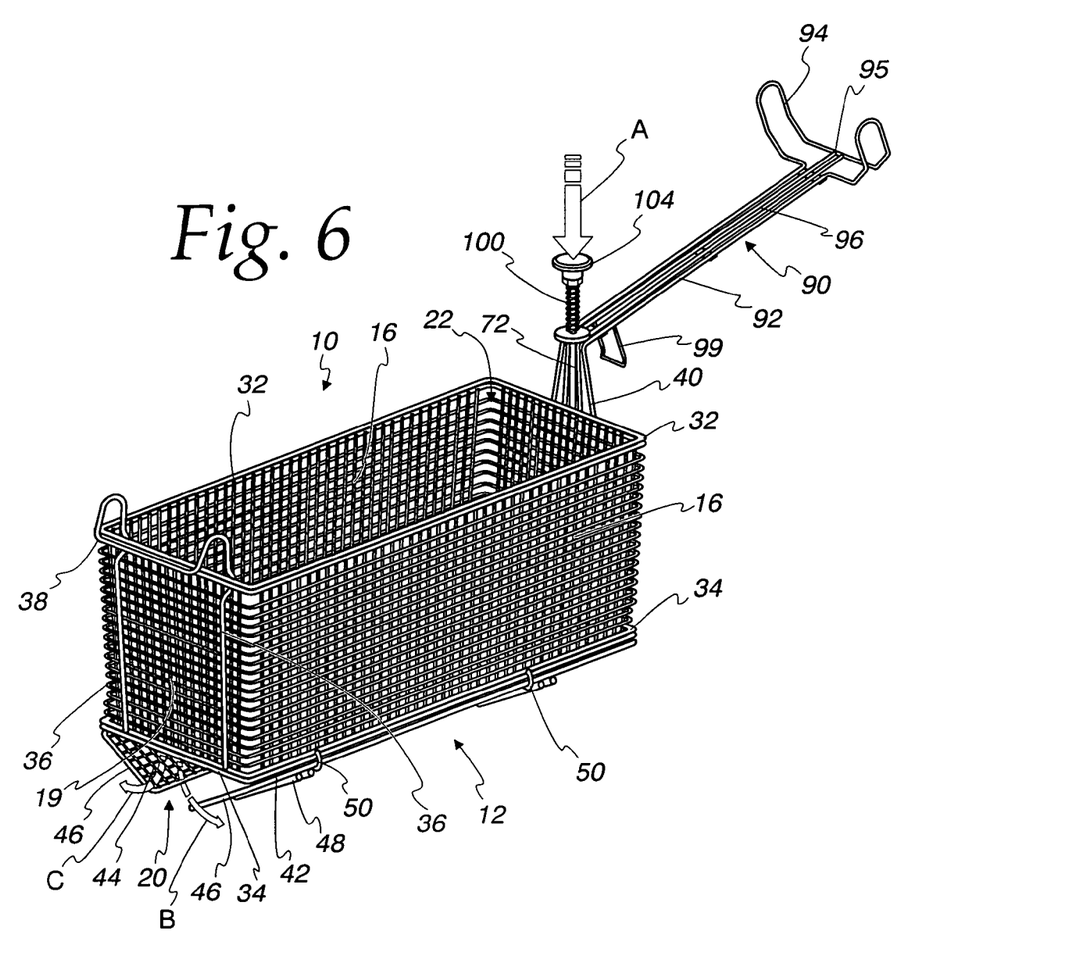
FIG. 6 is a side perspective view of the actuating mechanism of the fry basket in accordance with the present invention.

As shown in FIG. 6, two vertical rods 36 extend from the top strengthening rods 32 to bottom horizontally extending lower rod frame 34, to retain the rigidity of second end wall 19. In a preferred embodiment, two rods 36 are connected to each other above the level of strengthening rods 32 in the shape of a cantilevered hook 38 that extends beyond the extent of vertical rods 36 to enable the hook to mount on an attachment (not shown). Additional convergent rods 40 extend from lower rod frame 34 to strengthening rods 32, which converge from a point adjacent the bottom two corners of first end wall 18 toward an intersection point where handle 90 meets convergent rods 40.

Basket bottom 20 is shown as having two halves 42, 44 that each pivot about an axis that is parallel to and adjacent the longitudinally extending lower rod frame 34 of the side walls 16. Although shown as two halves 42, 44, other configurations of the bottom are also possible. For example, there may be a single pivotable bottom (not shown) that extends from one side wall 16 to the other side wall 16, covering the open bottom, which is defined between lower rod frame 34.

Figures 1, 2:
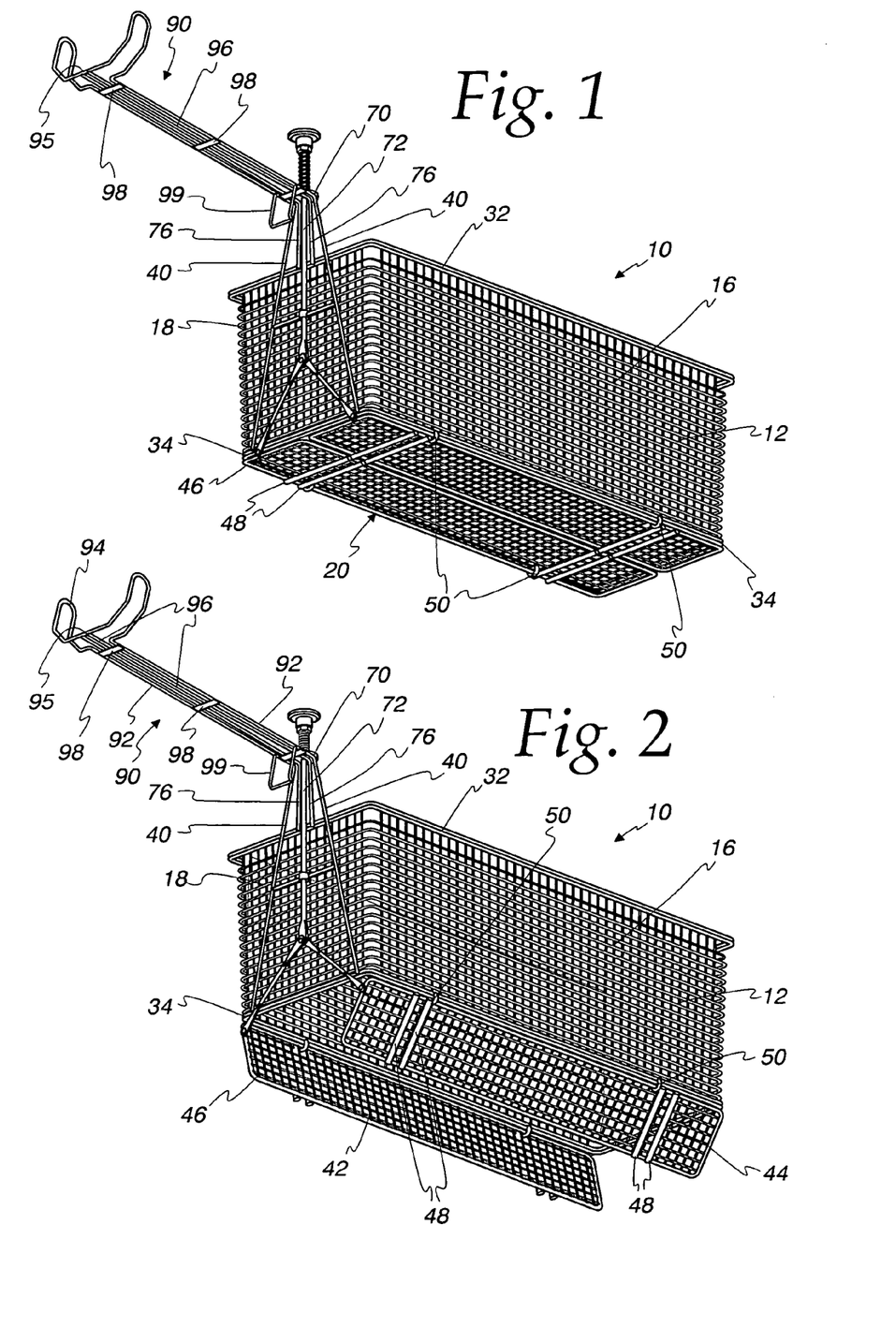
FIG. 1 is a perspective view of an embodiment of a fry basket in accordance with the present invention.
FIG. 2 is a perspective view of the embodiment of the fry basket in accordance with the present invention as shown in FIG. 1, with the bottom in an open position.
Figure 4:
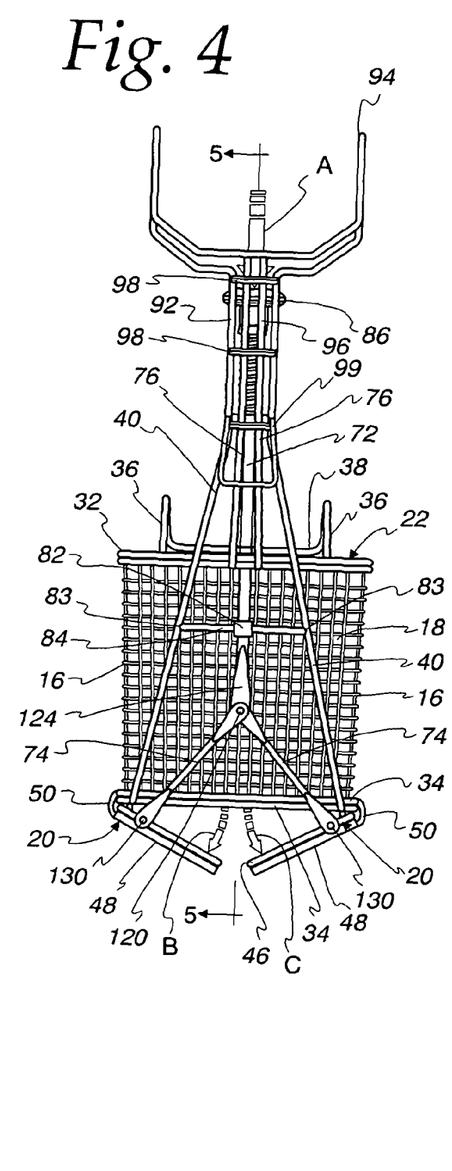
FIG. 4 is a side elevation view of a portion of a fry basket in accordance with the present invention shown in FIGS. 1-3.

The structure of bottom 20 is best shown in FIGS. 2 and 4, and this is the preferred embodiment because it provides the best transmission of forces in a balanced symmetrical manner as will be described below. A structural support to each half 42, 44 of bottom 20, comprising a wire mesh screen similar to that of walls 16,18 and 19, is provided by attachment of the edges of bottom halves 42,44 to a preferably metal structural support rod 46. The support rod 46 may also be attached to the edges of the wire mesh of bottom halves 42, 44 by welding, spot welding or other appropriate means, so that bottom halves 42, 44 move together with support rods 46. For further support, a plurality of cross support rods 48 extend from one longitudinal side of the structural support rods 46 to the other, as shown in FIGS. 2 and 4. Thus, each of bottom halves 42, 44 is sturdy and rugged enough to hold in place any bulk food items that are in basket 12.

Each of halves 42, 44 of bottom 20 is attached to side walls 16 of the basket 12 by an appropriate means, such as the two pivot rings 50. The pivot rings are each round, preferably metal, rings that encircle the side of support rods 46 that are adjacent and closest to rods 34 of side walls 16, as shown in FIG. 4. Rings 50 may also encircle rods 34, but preferably, the top portions of rings 50 are each attached, by welding or other appropriate means, to rods 34 of the bottom of side walls 16. Although rings 50 are shown as the means for pivoting bottom halves 42, 44, any other means for providing a pivoting capability, for example, a hinge (not shown) may be used.

Rings 50 provide a support at one side of each half 42, 44 of bottom 20, and also permit bottom halves 42, 44 to pivot about an axis that extends longitudinally along the bottom of side wall 16, just below the bottom of rod 34 and through the central portion of rings 50. Rings 50 each have a free diameter below rod 34 that is slightly larger than the inside diameter of rod 46, thereby permitting rod 46 to rotate about the pivot axis within the inside diameter of rings 50. The capability to rotate within the rings permits halves 42, 44 of basket bottom 20 to pivot about the pivot axis and to open basket bottom 20, thus permitting any objects, such as cooked bulk food to be released from the basket to a bulk food holding station, as in a conventional bulk food frying procedure.

One unique feature provided by the invention is the ability of fry basket 12 to retain all of the bulk food items within the basket until the operator is ready to empty the basket. This is ideally done by an easy-to-use actuating mechanism 68 that operates by manual activation but which is nevertheless capable of holding the bulk food items in the basket against the force of gravity which is acting on the food items. The operation of the actuation procedure to release the bulk food items will be described below following a detailed description of the structure of the actuating mechanism.

Actuating mechanism 68 provides for a reciprocating release that opens halves 42, 44 of fry basket bottom 20, and closes upon withdrawal of the actuation that provided the release. Actuating mechanism 68 is attached to the framework provided by the two converging support rods 40, and an actuating pin 72 extends from the adjacent intersection point of converging rods 40 downwardly from a threaded upper section 78 (FIG. 5) to the intersection of two pivoting shafts 74. To facilitate the reciprocal action of the actuating mechanism 68, a lower ring support 82, having a diameter slightly larger than the diameter of actuating pin 72, is provided some distance from upper support ring 70.

Lower ring support 82 is centrally located on a horizontally extending cross-support rod 84, which is attached at each of its ends 83 to converging rods 40, as shown in FIG. 4. The attachment may be by welding or other appropriate connection, as long as in the installed configuration supporting ring 82 is oriented so that the centerline is disposed in the vertical direction. Ring 82 receives actuating pin 72, and guides it in its reciprocating movement, but has a diameter that permits the reciprocating up and down movement of actuating pin 72 within ring 82.

Actuating pin 72 also passes through a second upper support ring 86 that is attached to a support rod assembly that includes the two convergent rods 40, as will be described below.

Referring now to the embodiments shown in FIGS. 1 and 2, convergent rods 40 meet at a common point adjacent upper support ring 70, and two additional vertical support rods 76 are also attached, for example by welding, to upper support ring 70 at one end. The other ends of vertical support rods 76 are attached, also preferably by welding, to upper strengthening rods 32 that extend above the first end wall 18.

Handle 90 is also attached to the rod assembly comprising convergent rods 40, vertical support rods 76 and upper support ring 70 by an appropriate means. Preferably, however, handle 90 comprises bent over extensions of four of the support rods, which are connected to each other, as shown in FIGS. 1 and 2. Specifically, a single rod is first bent into the desired shape before it is attached to the basket support rod structure. That is, convergent rods 40 are each bent once at a right angle to themselves at the intersection point, adjacent upper support ring 70, then include two outer handle support rods 92 extending away from the basket 12 toward a proximal end of the handle that includes an arm rest 94 bent in a saddle shape, shaped, dimensioned and oriented to receive a user's forearm during manipulation of the basket. As can be seen from FIGS. 1 and 2, outer handle support rods 92 and convergent rods 40 are all one unitary piece.

Similarly, the inner handle support rods 96 are extensions of vertical support rods 76, which are also bent at the intersection point adjacent upper support ring 70 toward arm rest 94, where each end of inner handle support rods 96 are attached to the proximally extending portions 95 of arm rest 94 that extends transversely to the longitudinal direction of the handle support rods 92,96. To maintain the rigidity of the handle, two or more cross-beams, comprising metal strips 98, are welded to each of rods 92, 96 extending from upper support ring 70 toward forearm rest 94. Optionally, and preferably, a finger hold 99 is attached to the distal end of handle 90 by welding two ends thereof to outer handle support rods 92 proximate to the intersection point adjacent upper support ring 70.

Alternative embodiment structures (not shown) where the majority of the elements are identical to those shown in FIGS. 1 and 2 can be contemplated. For example, rods 40 and vertical support rods 76 are shown in the figures as having an intersection point at a position adjacent upper support ring 70. However, it is possible that the intersection point may be lower in the assembly, e.g., an intersection point wherein the convergent rods come to a position approximately at the same level as upper horizontal strengthening rods 32. Such a configuration will permit at least a portion of the convergent rods to be bent to an upwardly or more vertical disposition parallel to vertical rods 76, to which they can be attached by, for example, welding, or by metal strips (not shown) similar to those attaching the handle support rods. This type of configuration may be used to provide a more rigid support to the handle-basket connection, or when the desired attachment position of the handle is desired to be lower relative to upper horizontal strengthening rods 32, depending on where the level of the frying vat will end up. In respect to the actuating pin, that, of course, would also be somewhat shorter in this configuration.

Figure 3:
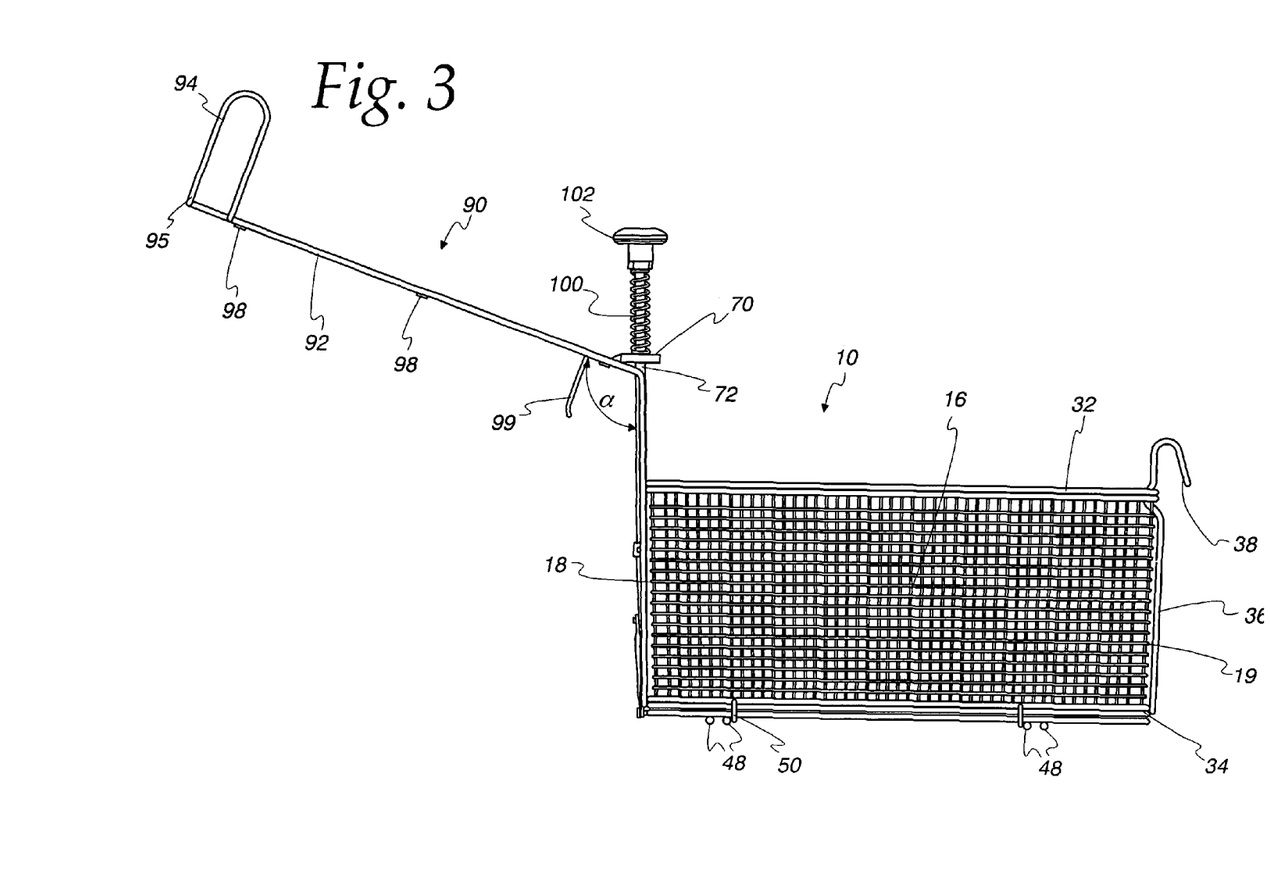
FIG. 3 is a side elevational view of the fry basket of FIG. 1.
Figure 5:
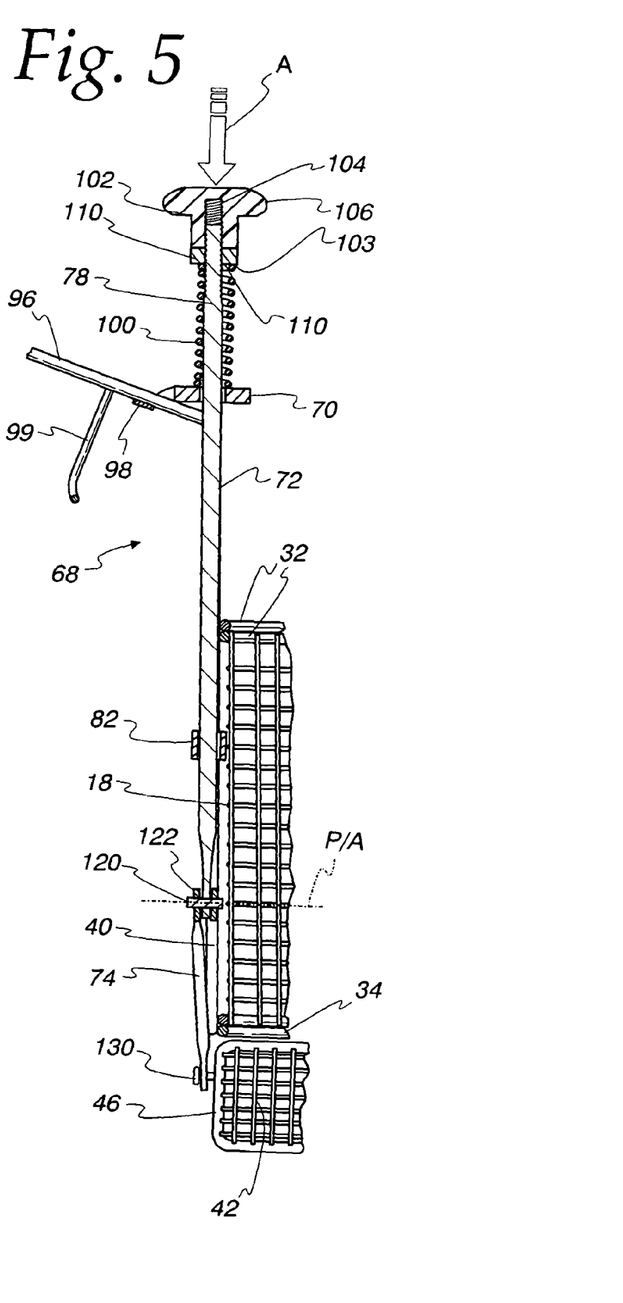
FIG. 5 is an elevational view of a portion of the fry basket in accordance with the present invention.

Referring now to FIGS. 3-5, the actuating pin 72 and associated elements and the operation of the inventive device will be described in greater detail. FIGS. 3 and 4 and the cross-sectional detail view of FIG. 5 provide the best views of the structural details of actuating pin 72, and reference is directed particularly to these figures. Actuating pin 72 extends vertically through the centers of the two support rings 70,82, as described above, and actuating pin 72 has freedom of reciprocating motion in the vertical direction through the support rings. As shown, a biasing member, specifically, a coil spring 100, is disposed around an upper section of actuating pin 72 between upper support ring 70 and a push-button type knob 102. Coil spring 100 provides a biasing force to the underside surface 103 of knob 102 because spring 100 becomes compressed upon installation.

Knob 102 has an internally threaded hole 104 (FIG. 5) which threads onto upper threaded section 78 of the actuating pin. A knob top section 106 is shaped and positioned relative to handle 90 to provide an easy capability to depress knob 102 downwardly against the biasing force of coil spring 100.

As shown in FIG. 5, knob 102 is not screwed completely onto threaded section 78 of actuating pin 72, but some part of the internal threaded hole 104 may not be completely screwed onto threaded section 78. In this way, the biasing force exerted by spring 100 against underside 103 of knob 102 can be varied, thereby also varying the biasing force that retains the fry basket bottom 20 in a closed position. Different users may determine that it is more appropriate to use the fry basket to fry more bulk food items, thereby increasing their weight impinging on pivotable halves 42, 44. Thus, appropriate adjustment of the height of knob 102 on the threads of threaded upper section 78 will determine the biasing force that is required to maintain bottom halves 42, 44 in the closed position for the appropriate amount or weight of the bulk food items expected to be removed by the fry basket 12 from the fry vat (not shown) after the cooking procedure is completed.

Also, with continued use, it is known that a spring may lose some of its resilience, and the ability to adjust the height of knob 102 and the distance between knob underside 103 and upper support ring 70 is capable of adjusting the biasing force to maintain the desired biasing force for maintaining the halves 42, 44 closed. To facilitate the adjustability of the height of knob 102, there is optionally disposed threaded lock nut 110 immediately adjacent knob underside surface 103. Lock nut 110 works in a conventional manner to fix the vertical position of threaded hole 104 on threaded section 78, by tightening lock nut 110 against surface 103 of knob 102. If the optional lock nut 110 is utilized, of course, the upper end of coil spring 100 will then contact lock nut 110, rather than surface 103, as when the lock nut is not present.

At its lower end, actuating pin 72 is attached to pivoting shafts 74 in a pivoting connection about a central pivot pin 120 which extends transversely to the vertical extension of actuating pin 72 through an aperture 122 in the lower end 124 of actuating pin 72. To facilitate the connection of pivot pin 120 through aperture 122, lower end 124 of actuating pin 72 is flattened out, as seen in FIGS. 4 and 5. The plane of the flattened out lower end 124 is essentially parallel to first end wall 18, and central pivot pin 120 has an axis that is essentially parallel to the pivoting axes of the two bottom halves 42,44 and to the longitudinal extent of fry basket 12.

To further facilitate the insertion of pivot pin 120, each of the two pivoting shafts 74 have both their ends flattened, so that the apertures, through which pin 120 extend, are oriented contiguously with aperture 122 of the lower end of actuating pin 72 along a pivot axis P/A, as shown in FIG. 5. The flattened out ends of pin 72 and shafts 74 also facilitate rotational motion of the ends relative to each other in the reciprocating operation of actuating pin 72.

Pivoting shafts 74 are connected through pivot pin 120 to the lower end of actuating pin 72 at an upper end of each of the shafts 74. Each of the shafts 74 has a lower end that also includes an aperture for connecting to bottom pivot pin 130, each one of which is connected to halves 42, 44 of the fry basket bottom 20. Pins 130 are attached to structural support rods 48 at their ends closest to first end wall 18 of fry basket 12. As best shown in FIG. 4, the connection point is removed from the pivot point defined by rings 50, around which each bottom half 42,44 pivots about its connection to lower rod frame 34. The removed pivot points of pins 130 should not be very far from the pivot points of each respective bottom half, 42,44, so that the motion of pivot pin 130 provides leverage to the connection of cross support rod 48, thus enabling complete downward opening of the fry basket bottom 20 (as shown in FIG. 2). The ratio of leverage for the relative motion need not be great, and may be in a range of from about 1:3 to about 1:6, or as shown about 1:5, to provide an opening actuation of about 1 to 1½ inches that will couple a pivoting arc of the side of the halves removed from the pivot point of about 3-5 inches. This ratio has been found to provide the best compromise between the need for efficient actuation by depression of knob 102 and the requirement to counteract the pull of gravity on the food items in the basket by the force of resilient coil spring 100.

The operation of actuating mechanism 68 provides for a reciprocating motion of actuating pin 72. The default position of mechanism 68 is a closed position, in which bottom halves 42, 44 of fry basket bottom 20 are closed in a horizontal position when the fry basket open top is uppermost, as is shown in FIG. 1. In this position the two central sides of the pivotable bottom halves are very close to each other so as not to leave a gap therebetween, thus avoiding food items in the fry basket from floating out during the frying or oil drip procedures as is necessary with reference to the complete bulk food frying procedure. Thus, uncooked bulk food items dumped into fry basket 12 through open top 22 will remain in the basket during the complete procedure until actuating pin 72 is actuated by the operator.

The fry basket is then placed into the fry vat in a conventional way, with the hook 38 attaching to a hook attachment (not shown) on the distal side of the fry vat. The handle assembly is mounted on a fry mount located on the proximal side of the fry vat, thereby maintaining a horizontal position of the top strengthening rods 32 defining opening 22, and at a level that is above the level of the oil in the fry vat. The level is chosen so that the bulk food items are in the frying oil which is free to enter the fry basket through the openings between the wires of walls 16,18 and 19 and of bottom 20, so as to engulf the bulk food items. The food items are then fried for an appropriate amount of time, as determined by frying procedures not a part of the present invention, and the fry basket is removed from the fry vat and mounted on a second hook attachment, above the frying attachment, to permit the excess oil to drip from the fried food items and the basket. Because the mount attachment is distally located directly above the fry vat, the oil from the fry basket drips directly into the fry vat itself for use in the next frying cycle. Through this step, the procedures are essentially identical to most conventional procedures for frying bulk food items. At this point, in a conventional procedure, the fry basket is emptied by turning over the basket above a bulk food holding or bagging station, where the bulk food items, for example, French fries, are kept in a pile for further processing, including salting or other seasoning and subsequent packaging into individual customer packages for delivery to the customer.

Another advantage provided by the unique downwardly dumping feature is that the handle assembly 90 can be altered to provide a more ergonomic design for more efficient and easier handling by the operator. Because fry basket 12 need not be turned over, the handle may extend at an angle a from the first end wall 18, as shown in the elevational plan view of FIG. 3. The handle extension assists in the manipulation of fry basket 12 between the various stations by a simple procedure and by providing an ergonomically designed handle that does not stress the operator's hands or arms.

The angle at which handle assembly 90 extends relative to first end wall 18 is preferably an obtuse angle, in a range of from 100° to about 135°. However, an angle $\alpha$ of about 105°, as shown in FIG. 3 has been found to provide the ideal leverage for an operator who is holding handle assembly 90 at approximately the level of finger hold 99, with the thumb of the operator's hand being located above handle support rods 92,96, capable of reaching knob 102.

Arm rest 94 preferably provides a semicircular enclosure for the operator's forearm when the operator is holding handle 90. Proximally extending portions 95 of arm rest 94 serve the dual function of ensuring leverage provided by handle 90 as fry basket 12 is lifted from the fry vat, and also provides for better handling of fry basket 12 because upwardly extending portions 95 do not permit motion of the basket in the horizontal direction when it is properly held.

The present invention, however, permits the emptying of fry basket 12 without requiring the operator to turn the basket upside down. The procedure is a simple one, where the only action that the operator needs to take is to depress knob 102 downwardly, in the direction of the arrow A in FIG. 5, which causes the fry basket bottom 20 to open completely, thereby to dump all of the contents therefrom onto the bulk food storage or bagging station (not shown) or other desired location.

The operation and advantages of the bottom dump feature will be clearly evident once an understanding of the invention is achieved. That is, the bottom dump of the bulk fast food items provided by the unique actuation mechanism is healthier, more sanitary, more efficient and much easier to use than the standard or conventional fry baskets. The simple depressing of a push-button knob 102, which pushes pivot pin 120 downwardly and the downward, and partly sideways motion of shafts 74, thus causing the pivoting rotation of bottom pins 130 and of each of bottom halves 42,44 to completely open fry basket bottom 20 uniquely provides for the advantages set forth above without sacrificing any operational or structural characteristics of the frying operation.

Referring now to FIG. 6, a perspective view of the top of fry basket 12 is shown as viewed from second end wall 19 toward first end wall 18 and handle 90. As shown, basket bottom 20 is open, as it would be in the dump position, which would result from fully depressing knob 102. Open top 22 provides for loading of the uncooked bulk food items, which are first dispensed into fry basket 12, where the bulk food items are retained by the closed bottom (FIG. 1). Fry basket 12 with the bulk food items therein is then placed into the oil in a conventional fry vat (not shown) at a frying station adjacent the cooked bulk food item storage at a bulk food item dispensing or packaging station (not shown). The bulk food item dispensing station may be a conventional one or may have one or more inventive features, such as those shown in and described in aforementioned commonly owned U.S. application Ser. No. 11/413,233, filed on Apr. 28, 2006.

After the bulk food frying procedure has been completed, the cooked bulk food items are removed from the fry vat by lifting handle 90 and fry basket 12 out of the oil, and then hook 38 is used to temporarily attach the fry basket 12 on a mounting structure above the fry vat at the frying station, so as to permit excess oil to drip back into the fry vat, as is conventionally done.

Once all excess oil has dripped off of the bulk food items, the fry basket 12 is removed from the fry station by handle 90 and it is then transferred over the bulk food holding station over which the operator depresses knob 102 in the direction of arrow A, which releases fry basket bottom 20 by opening halves 42, 44 in the rotational directions indicated by arrows B and C, respectively, to permit the cooked bulk food items to be dropped out of the open bottom of fry basket 12, by the easy, efficient and expedient method of simply positioning fry basket 12 over the dump station, and depressing knob 102.

Understanding of the structure and operation of the present invention permits one of ordinary skill in the art to contemplate alternative structures having minor modifications or alterations, while continuing to use the principles of the present invention. For example, while two halves of the bottom are shown as pivoting from the bottom edges of side walls 16, alternative embodiments may have a single panel on the bottom, or the pivot axes for a dual panel structure may be along the bottom edges of the two end walls 18,19.

Figures 7, 8, 9:
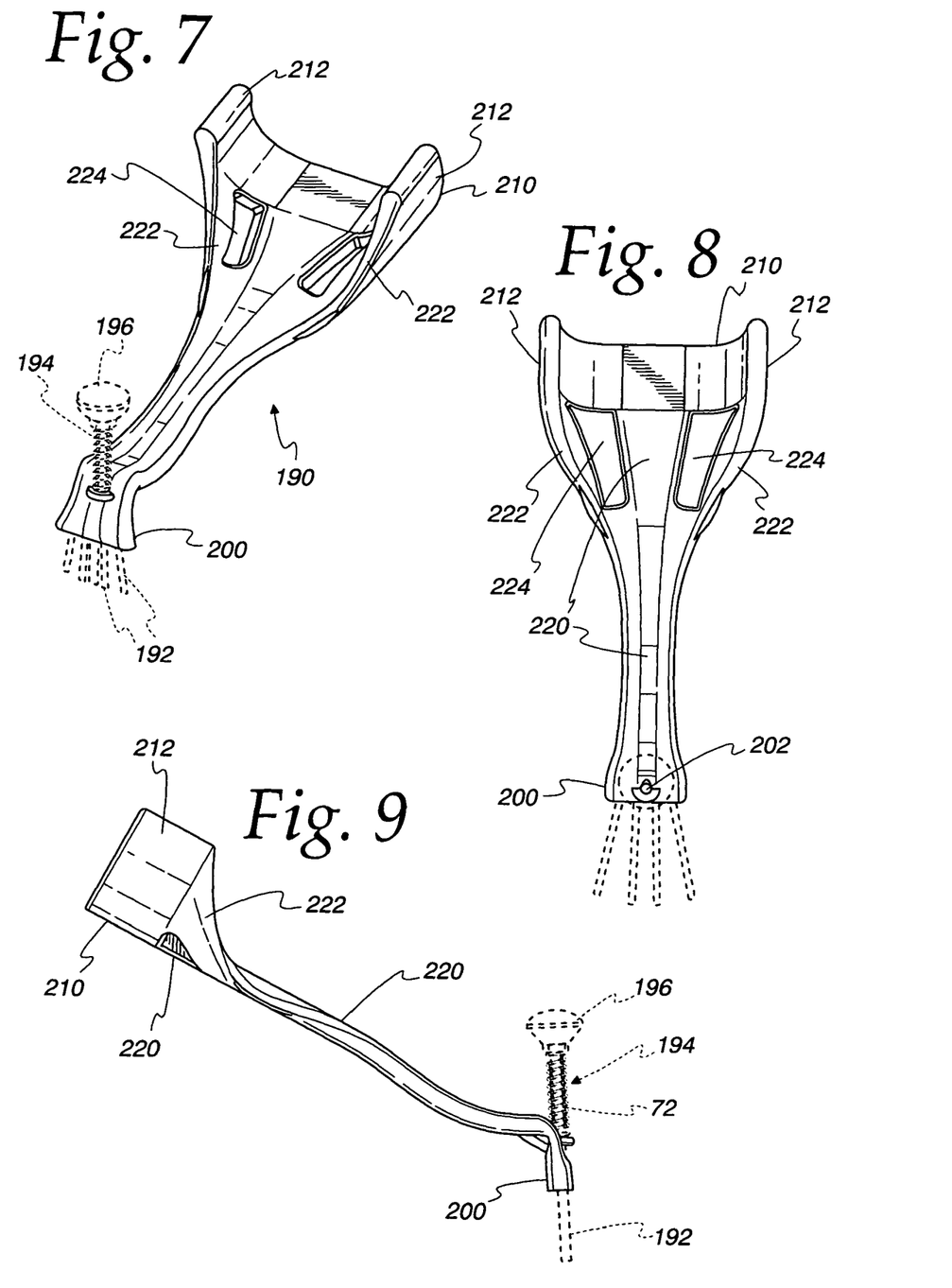
FIG. 7 is a perspective view of an alternative embodiment of the handle portion of the fry basket according to the present invention.
FIG. 8 is a top view of the handle portion shown in FIG. 7.
FIG. 9 is a side elevational view of the handle portion shown in FIGS. 7 and 8.

Referring now to FIGS. 7-8, there is illustrated another embodiment of the fry basket handle of the inventive fry basket. While the earlier described embodiment had a handle made from twisted metal wires or rods, the handle 190 is made from, preferably, a hard plastic such as polyurethane, polyethylene or acrylonitrile butadiene styrene (ABS), which material is not readily heat conductive, but is strong enough to support the weight of the metal wire or rod fry basket 192 partially shown in phantom lines. The remainder of the fry basket configuration, including the actuator 194, also shown in phantom, is essentially identical to that shown and described with reference to the embodiments of FIGS. 1-6, and no further discussion is considered necessary with respect to those aspects.

Handle 190 is preferably a unitary or integral part which is preferably injection molded and attached to the wires or rods of basket 192 after the construction of the remainder of the fry basket has been completed. The molding process encapsulates the ends of basket 192 within one end 200 of the plastic handle 190 to create a unitary structure that is as sturdy as the wire rod structure handle 90 of fry basket 12. The actuating pin 72 of actuator 194 is then inserted through an aperture 202 that extends through the body of end 200, as shown in FIGS. 7 and 9. The remainder of handle 190 is molded as one integral piece and functions essentially as does handle 90 of FIGS. 1-5.

Handle 190 includes first end 200 that connects to the wire rods of basket 192, and a second end 210 that provides an enclosing or support structure for a user's forearm during use. The enclosing structure of end 210 comprises two upwardly curved wings 212 having rounded tops, and being separated at the upper regions by a lateral separation region that is larger than an average user's forearm. The separation distance is preferably in the range of from 4 to 6 inches, (about 10-15 cm), with a 5 inch (12.5 cm) separation distance being most preferred.

The second end 210 is connected to the first end 200 by a sturdy intermediate connecting portion 220 that extends from about the center or lowermost portion of the second end 210 to the first end 200. Preferably, the intermediate connecting portion comprises a thickness of plastic material that is sturdy enough to support a fully loaded fry basket, which may weigh about 4-10 pounds total weight.

To provide added support, two buttresses 222 extend from the upper portions of wings 212 to intermediate connecting portion 220, and may be separated from portion 220 by two apertures 224. Buttresses 222 merge into the upper portions of wings 212 in a fluid manner, as shown, and also merge into intermediate connecting portion 220 about half of the distance between ends 200, 210.

As can be seen from the side view of FIG. 9, intermediate connecting portion 220 may have an undulating profile that provides for a more ergonomically formed handle structure for easier manipulation of handle 190 by the operator. Optionally, one or more finger holds (not shown) may also be provided at the first end 200 as an aid to the operator in holding the first end in one hand while depressing the knob 196 to actuate the release of the bottom of the fry basket.

As disclosed and illustrated, the inventive fry basket having either handle 90 or 190 provides the capability to the operator to manipulate the fry basket using a single hand, leaving the other hand free to complete other tasks or to provide support to the operator. Moreover, the ability to dump the contents of the fry basket without necessitating the turning over of the basket permits more control over the processing and is ergonomically much easier on the operator who must perform the processing of successive batches of food items numerous times during a mealtime rush. Thus, the inventive fry basket provides numerous advantages that derive from the features illustrated herein and described above.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. An open top fry basket device for use in deep frying, comprising:
   a wire mesh basket portion having a bottom, a pair of opposed wire mesh side walls, a wire mesh front end wall and a wire mesh back end wall, the opposed wire mesh side walls being elongated compared to the front and back end walls, the bottom being attached to at least one of the wire mesh side walls in a pivotable connection;
   a handle portion extending away from the back end wall, the handle portion comprising a handle extending away from the wire mesh basket portion;
   wherein said pivotable connection is associated with a pivotable axis of rotation enabling pivoting of at least one portion of the bottom, the pivotable axis extending along the length of at least one of said side walls, and wherein the pivotable axis extends from one end wall to the opposed end wall, so that when the at least one portion of said bottom is pivoted about the pivotable axis, the bottom opens downwardly thereby permitting objects in the basket portion to be dispensed therefrom;
   the handle portion further comprising an actuator adjacent said handle in close proximity to said wire mesh back end wall, the actuator being connected to at least one pivoting shaft including a pivotable actuating connection to at least one portion of said bottom, said actuator, when actuated causing the at least one portion of said bottom to pivot about said pivotable actuating connection and said pivotable side wall connection to thereby open said bottom and permit an object contained in said wire mesh basket portion to be dispensed therefrom by gravity.

2. The open top fry basket device according to claim 1 wherein the bottom of the wire mesh basket portion further comprises two longitudinally extending bottom portions, each bottom portion comprising a wire mesh screen attached to a surrounding wire rod, and each bottom portion being pivotably attached to one of the two opposed side walls by a plurality of rings surrounding one side of the wire rod.

3. The open top fry basket device according to claim 1, wherein the pivotable actuating connection to at least one portion of said bottom comprises a lower pivot pin separated from said pivotable axis, and the at least one pivoting shaft is connected at one end to said lower pivot pin and at another end to the actuator.

4. The open top fry basket device according to claim 3, wherein the actuator further comprises an actuating pin disposed adjacent said handle, the actuating pin extending vertically above the handle portion at one end thereof and connected to said at least one pivoting shaft at another end by means of an upper pivot pin.

5. The open top fry basket device according to claim 4, wherein the actuating pin is supported by a rod structure that is attached to the back end wall, the actuating pin being connected to two pivoting shafts by the upper pivot pin, each pivoting shaft being connected to a lower pivot pin, each lower pivot pin being disposed on one of the two bottom halves.

6. The open top fry basket device according to claim 1, wherein the handle extends at an obtuse angle relative to the back end wall.

7. The open top fry basket device according to claim 1, wherein a distal end of the handle portion is connected to the top of the back end wall and the proximal end of the handle includes flanged supports extending upwardly from the handle portion to partially surround the operator's forearm and inhibit sideways motion of the handle portion relative to the operator's forearm.

8. The open top fry basket device according to claim 1, wherein the handle portion extends from the top of the back end wall and the handle extends at an obtuse angle relative to the back end wall.

9. The open top fry basket device according to claim 1, wherein the handle portion further comprises a plurality of wire rods connected to the top of said back end wall, the wire rods further having an attachment section extending downwardly from the handle to attachment points disposed on the back end wall.

10. The open top fry basket device according to claim 1, wherein the handle portion further comprises a unitary plastic handle, a distal end of the handle portion being connected to the top of the back end wall of the wire mesh basket portion through a plurality of wire rods.

11. The open top fry basket device according to claim 10, wherein the handle extends at an obtuse angle relative to the back end wall and a proximal end of the handle includes flanged supports extending upwardly from the handle portion to partially surround the operator's forearm and inhibit sideways motion of the handle portion relative to the operator's forearm.

12. An open top fry basket device for use in deep frying, comprising:
   a wire mesh basket portion having a bottom, a pair of opposed wire mesh side walls, a wire mesh front end wall and a wire mesh back end wall, the bottom comprising two longitudinally extending bottom halves of substantially equal proportions, each bottom half comprising a wire mesh screen attached to a surrounding wire rod, and each bottom half being attached to a respective one of the wire mesh side walls in a pivotable connection by a plurality of rings surrounding one side of the wire rod, the one side of the wire rod extending along the pivotable axis from one end wall to the opposed end wall; and
   each of said pivotable connections being associated with a pivotable axis of rotation enabling pivoting of the corresponding bottom half, each pivotable axis extending along the length of a bottom edge of the respective one of said side walls from one end wall to the opposed end wall, so that when the at least one portion of said bottom is pivoted about the pivotable axis, the bottom opens downwardly thereby permitting objects in the basket portion to be dispensed therefrom;
   a handle portion extending away from the back end wall, the handle portion comprising a handle extending away from the wire mesh basket portion; and
   the handle portion further comprising an actuator adjacent said handle, the actuator being connected to at least one pivoting shaft including a pivotable actuating connection to a separate one of each of said bottom halves, said actuator, when actuated, causing the said bottom halves to pivot about said pivotable actuating connection and said respective pivotable connections to thereby open said bottom and permit an object contained in said wire mesh basket portion to be dispensed therefrom by gravity.

13. The open top fry basket device according to claim 12, wherein the handle extends at an obtuse angle relative to the back end wall.

14. The open top fry basket device according to claim 12, wherein a distal end of the handle portion is connected to the top of the back end wall and the proximal end of the handle includes flanged supports extending upwardly from the handle portion to partially surround the operator's forearm and inhibit sideways motion of the handle portion relative to the operator's forearm.

15. The open top fry basket device according to claim 12, wherein the handle portion further comprises a plurality of wire rods connected to the top of said back end wall, the wire rods further having an attachment section extending downwardly from the handle to attachment points disposed on the back end wall.

16. The open top fry basket device according to claim 12, wherein the handle portion further comprises a unitary plastic handle, a distal end of the handle portion being connected to the top of the back end wall of the wire mesh basket portion through a plurality of wire rods.

17. The open top fry basket device according to claim 16, wherein the handle extends at an obtuse angle relative to the back end wall and a proximal end of the handle includes flanged supports extending upwardly from the handle portion to partially surround the operator's forearm and inhibit sideways motion of the handle portion relative to the operator's forearm.

18. An open top fry basket device for use in deep frying, comprising:
 a wire mesh basket portion having a bottom, a pair of opposed wire mesh side walls, a wire mesh front end wall and a wire mesh back end wall, the bottom being attached to at least one of the wire mesh side walls in a pivotable connection; and
 a handle portion extending away from the back end wall, the handle portion comprising a handle extending away from the wire mesh basket portion;
 said pivotable connection being associated with a pivotable axis of rotation enabling pivoting of at least one portion of the bottom, the pivotable axis extending along the length of at least one of said side walls;
 the pivotable axis extending from one end wall to the opposed end wall, so that when the at least one portion of said bottom is pivoted about the pivotable axis, the bottom opens downwardly thereby permitting objects in the basket portion to be dispensed therefrom; and
 the handle portion further comprising an actuator adjacent said handle in close proximity to said wire mesh back end wall, the actuator being connected to at least one pivoting shaft including a pivotable actuating connection to at least one portion of said bottom, said actuator, when actuated, causing the at least one portion of said bottom to pivot about said pivotable actuating connection and said pivotable side wall connection to thereby open said bottom and permit any object contained in said wire mesh basket portion to be dispensed therefrom by gravity;
 the pivotable actuating connection to at least one portion of said bottom comprising a lower pivot pin separated from said pivotable axis, and the at least one pivoting shaft being connected at one end to said lower pivot pin and at another end to the actuator; and
 the actuator further comprising an actuating pin disposed adjacent said handle, the actuating pin extending vertically above the handle portion at one end thereof and connected to said at least one pivoting shaft at another end by means of an upper pivot pin.

19. The open top fry basket device according to claim 18, wherein the actuating pin is supported by a rod structure that is attached to the back end wall, the actuating pin being connected to two pivoting shafts by the upper pivot pin, each pivoting shaft being connected to a lower pivot pin, each lower pivot pin being disposed on one of the two bottom halves.

20. An open top fry basket device for use in deep frying, comprising:
 a wire mesh basket portion having a bottom, a pair of opposed wire mesh side walls, a wire mesh front end wall and a wire mesh back end wall, the opposed wire mesh side walls being elongated compared to the front and back end walls, the bottom being attached to at least one of the wire mesh side walls in a pivotable connection;
 a handle portion extending away from the back end wall, the handle portion comprising a handle extending away from the wire mesh basket portion;
 wherein said pivotable connection is associated with a pivotable axis of rotation enabling pivoting of at least one portion of the bottom, the pivotable axis extending along the length of at least one of said side walls, and wherein the pivotable axis extends from one end wall to the opposed end wall, so that when the at least one portion of said bottom is pivoted about the pivotable axis, the bottom opens downwardly thereby permitting objects in the basket portion to be dispensed therefrom;
 wherein the bottom of the wire mesh basket portion further comprises two longitudinally extending bottom portions, each bottom portion comprising a wire mesh screen attached to a surrounding wire rod, and each bottom portion being pivotably attached to one of the two opposed side walls by a plurality of rings surrounding one side of the wire rod.

21. An open top fry basket device for use in deep frying, comprising:
 a wire mesh basket portion having a bottom, a pair of opposed wire mesh side walls, a wire mesh front end wall and a wire mesh back end wall, the opposed wire mesh side walls being elongated compared to the front and back end walls, the bottom being attached to at least one of the wire mesh side walls in a pivotable connection;
 a handle portion extending away from the back end wall, the handle portion comprising a handle extending away from the wire mesh basket portion;
 wherein said pivotable connection is associated with a pivotable axis of rotation enabling pivoting of at least one portion of the bottom, the pivotable axis extending along the length of at least one of said side walls, and wherein the pivotable axis extends from one end wall to the opposed end wall, so that when the at least one portion of said bottom is pivoted about the pivotable axis, the bottom opens downwardly thereby permitting objects in the basket portion to be dispensed therefrom;
 the handle portion further comprising an actuator adjacent said handle, the actuator being connected to at least one pivoting shaft including a pivotable actuating connection to at least one portion of said bottom, said actuator, when actuated, causing the at least one portion of said bottom to pivot about said pivotable actuating connection and said pivotable side wall connection to thereby open said bottom and permit an object contained in said wire mesh basket portion to be dispensed therefrom by gravity.

* * * * *